US012170885B2

(12) United States Patent
Lehnert et al.

(10) Patent No.: US 12,170,885 B2
(45) **Date of Patent: *Dec. 17, 2024**

(54) SYSTEMS AND METHODS OF ADJUSTING BASS LEVELS OF MULTI-CHANNEL AUDIO SIGNALS

(71) Applicant: Sonos, Inc., Santa Barbara, CA (US)

(72) Inventors: Hilmar Lehnert, Framingham, MA (US); Aurelio Ramos, Jamaica Plain, MA (US); Bob Dizon, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,387

(22) Filed: Jun. 9, 2023

(65) Prior Publication Data

US 2023/0328475 A1 Oct. 12, 2023

Related U.S. Application Data

(63) Continuation of application No. 17/135,358, filed on Dec. 29, 2020, which is a continuation of application (Continued)

(51) Int. Cl.

*G10L 25/21* (2013.01)
*G10L 21/0272* (2013.01)

(Continued)

(52) U.S. Cl.

CPC .......... *H04S 7/307* (2013.01); *G10L 21/0272* (2013.01); *G10L 25/21* (2013.01);

(Continued)

(58) Field of Classification Search

None

See application file for complete search history.

(56) References Cited

U.S. PATENT DOCUMENTS 5,440,644 A 8/1995 Farinelli et al.
5,761,320 A 6/1998 Farinelli et al.

(Continued)

FOREIGN PATENT DOCUMENTS

EP 1389853 A1 2/2004
JP 2015177439 A 10/2015

(Continued)

OTHER PUBLICATIONS

AudioTron Quick Start Guide, Version 1.0, Mar. 2001, 24 pages.

(Continued)

*Primary Examiner* — Quynh H Nguyen
(74) *Attorney, Agent, or Firm* — Akerman LLP

(57) ABSTRACT

Systems and methods for adjusting bass levels of a multi-channel audio signal include, among other features, (i) receiving the multi-channel signal via a playback device; (ii) separating, from the multi-channel signal, low-frequency signals comprising frequencies less than a threshold frequency; (iii) determining electrical energies of the low-frequency signals; (iv) determining a first energy by summing the electrical energies of the low-frequency signals; (v) consolidating the low-frequency signals into a consolidated low-frequency signal; (vi) determining a second energy by determining an electrical energy of the consolidated low-frequency signal; (vii) generating a gain-adjusted low-frequency signal by adjusting a gain of the consolidated low-frequency signal based on both (a) the first energy and (b) the second energy; (viii) generating a gain-adjusted multi-channel signal by mixing the gain-adjusted low-frequency signal back into the multi-channel signal; and (ix) using the gain-adjusted multi-channel signal to play back gain-adjusted multi-channel audio content via the playback device.

20 Claims, 8 Drawing Sheets

Related U.S. Application Data

No. 16/582,942, filed on Sep. 25, 2019, now Pat. No. 10,880,671, which is a continuation of application No. 15/927,981, filed on Mar. 21, 2018, now Pat. No. 10,462,599.

(51) Int. Cl.

| | |
|---|---|
| ***H04R 5/02*** | (2006.01) |
| ***H04R 5/04*** | (2006.01) |
| ***H04S 3/00*** | (2006.01) |
| ***H04S 7/00*** | (2006.01) |

(52) U.S. Cl.

CPC ................ *H04R 5/02* (2013.01); *H04R 5/04* (2013.01); *H04S 3/006* (2013.01); *H04S 3/002* (2013.01); *H04S 2400/01* (2013.01); *H04S 2400/07* (2013.01); *H04S 2400/13* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,706,327 | B2 | 7/2017 | Brannmark et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0029239 | A1 | 2/2006 | Smithers |
| 2006/0093158 | A1 | 5/2006 | Noro |
| 2007/0142944 | A1 | 6/2007 | Goldberg et al. |
| 2009/0190773 | A1 | 7/2009 | Katayama et al. |
| 2010/0278346 | A1 | 11/2010 | Hogue et al. |
| 2011/0182869 | A1 | 7/2011 | Knol et al. |
| 2014/0369504 | A1 | 12/2014 | Bongiovi et al. |
| 2016/0234623 | A1* | 8/2016 | Ramos .................. H04R 11/00 |
| 2016/0277855 | A1 | 9/2016 | Raz |
| 2019/0014409 | A1* | 1/2019 | Dyreby .................. H04R 5/02 |
| 2020/0100046 | A1 | 3/2020 | Seldess |

FOREIGN PATENT DOCUMENTS

| | | | |
|---|---|---|---|
| WO | 9806239 | A1 | 2/1998 |
| WO | 200153994 | | 7/2001 |
| WO | 2003093950 | A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Apr. 20, 2021, issued in connection with European Application No. 19715306.7, 5 pages.
European Patent Office, European EPC Article 94.3 mailed on Jan. 20, 2023, issued in connection with European Application No. 19715306.7, 4 pages.
International Bureau, International Preliminary Report on Patentability, mailed on Oct. 1, 2020, issued in connection with International Application No. PCT/US2019/022964, filed on Mar. 19, 2019, 9 pages.
International Bureau, International Search Report and Written Opinion mailed on Jun. 13, 2019, issued in connection with International Application No. PCT/US2019/022964, filed on Mar. 19, 2019, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Sep. 29, 2022, issued in connection with U.S. Appl. No. 17/135,358, filed Dec. 28, 2020, 14 pages.
Non-Final Office Action mailed on Apr. 6, 2020, issued in connection with U.S. Appl. No. 16/582,942, filed Sep. 25, 2019, 14 pages.
Notice of Allowance mailed on Feb. 23, 2023, issued in connection with U.S. Appl. No. 17/135,358, filed Dec. 28, 2020, 5 pages.
Notice of Allowance mailed on Jun. 24, 2019, issued in connection with U.S. Appl. No. 15/927,981, filed Mar. 21, 2018, 11 pages.
Notice of Allowance mailed on Aug. 25, 2020, issued in connection with U.S. Appl. No. 16/582,942, filed Sep. 25, 2019, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SYSTEMS AND METHODS OF ADJUSTING BASS LEVELS OF MULTI-CHANNEL AUDIO SIGNALS

CROSS-REFERENCE TO RELATED APPLICATIONS

The application is a continuation of U.S. application Ser. No. 17/135,358 titled "Systems and Methods of Adjusting Bass Levels of Multi-Channel Audio Signals," filed on Dec. 29, 2020, and currently pending; U.S. application Ser. No. 17/135,358 is a continuation of U.S. application Ser. No. 16/582,942 titled "Systems and Methods of Adjusting Bass Levels of Multi-Channel Audio Signals," filed on Sep. 25, 2019, and issued as U.S. Pat. No. 10,880,671 on Dec. 29, 2020; U.S. application Ser. No. 16/582,942 is a continuation of U.S. application Ser. No. 15/927,981 titled "Systems and Methods of Adjusting Bass Levels of Multi-Channel Audio Signals," filed on Mar. 21, 2018, and issued as U.S. Pat. No. 10,462,599 on Oct. 29, 2019. The entire contents of U.S. application Ser. Nos. 17/135,358; 16/582,942; and 15/927,981 are incorporated by reference herein.

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Network devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

The present disclosure describes systems and methods for, among other things, adjusting bass levels of a multi-channel audio signal for playback by a playback device.

Some example embodiments involve receiving, by a playback device, a multi-channel audio signal representing multi-channel audio content for playback by the playback device. In some embodiments, the playback device separates, from respective channels of the multi-channel audio signal, respective low-frequency audio signals that are below a threshold frequency. The playback device determines respective electrical energies of each respective low-frequency audio signal and determine a first energy by summing the respective electrical energies of each respective low-frequency audio signal. The playback device also consolidates the respective low-frequency audio signals into a consolidated low-frequency audio signal and determines a second energy by determining an electrical energy of the consolidated low-frequency audio signal. Further, the playback device generates a gain-adjusted low-frequency audio signal by adjusting a gain of the consolidated low-frequency audio signal based on both (i) the first energy and (ii) the second energy. Next, the playback device generates a gain-adjusted multi-channel audio signal by mixing the gain-adjusted low-frequency audio signal back into the respective channels of the multi-channel audio signal. Finally, the playback device uses the gain-adjusted multi-channel audio signal to play back gain-adjusted multi-channel audio content via a plurality of audio drivers of the playback device.

Some embodiments include an article of manufacture comprising tangible, non-transitory, computer-readable media storing program instructions that, upon execution by one or more processors of a playback device, cause the playback device to perform operations in accordance with the example embodiments disclosed herein.

Some embodiments include a playback device comprising one or more processors, as well as tangible, non-transitory, computer-readable media storing program instructions that, upon execution by the one or more processors, cause the playback device to perform operations in accordance with the example embodiments disclosed herein.

This summary overview is illustrative only and is not intended to be limiting. In addition to the illustrative aspects, embodiments, and features described above, further aspects, embodiments, and features will become apparent by reference to the figures and the following detailed description.

BRIEF DESCRIPTION OF THE DRAWINGS

Features, aspects, and advantages of the presently disclosed technology may be better understood with regard to the following description, appended claims, and accompanying drawings where:

Figure 1:
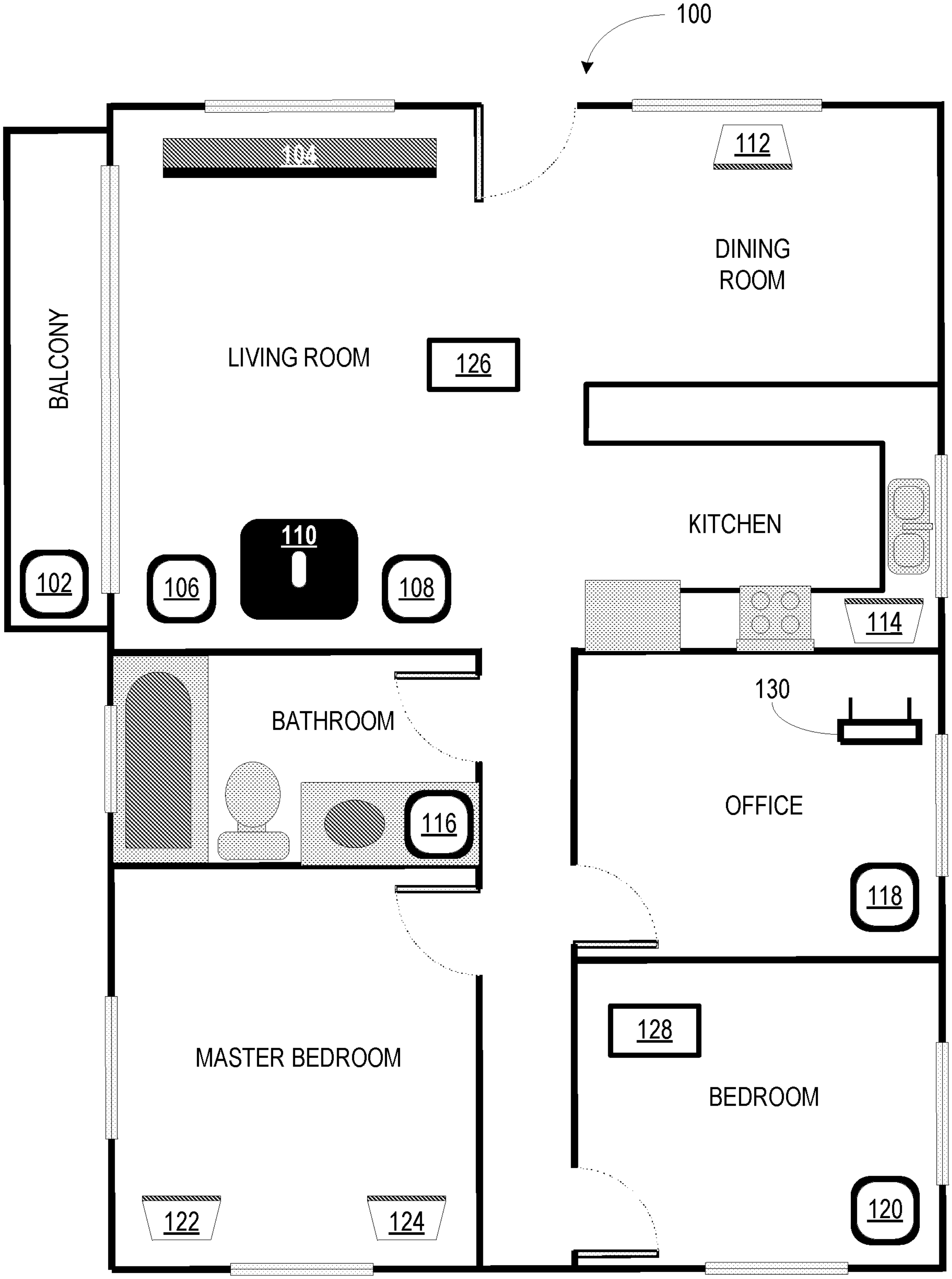
FIG. 1 is a schematic plan view of a media playback system configured in accordance with embodiments of the disclosed technology.

The drawings are for the purpose of illustrating example embodiments, but it is understood that the inventions are not limited to the arrangements and instrumentalities shown in the drawings.

DETAILED DESCRIPTION

I. Overview

A playback device, according to some embodiments, includes one or more audio drivers configured to form corresponding "sound axes." In some cases, a single audio driver forms a single sound axis, or two or more audio drivers may be arrayed to form a sound axis. For example, a playback device with multiple audio drivers (e.g., a soundbar-type device) may form multiple sound axes (e.g., three sound axes). Any audio driver may contribute to any number of sound axes. Further, a given sound axis may be formed by contributions from all audio drivers of a soundbar or from only some of the audio drivers.

In some embodiments, each sound axis corresponds to a respective input channel of audio content. For instance, audio drivers of a playback device may form two sound axes corresponding, respectively, to left and right channels of stereo content. As another example, the audio drivers may form sound axes corresponding to respective channels of surround sound content (e.g., front left, center, front right, rear left, and rear right channels).

In some embodiments, arraying two or more audio drivers to form a given sound axis causes the two or more audio drivers to "direct" the sound output for the given sound axis in a certain direction. For instance, where multiple audio drivers of a soundbar are each contributing a portion of a sound axis corresponding to a left channel of surround sound content, the audio drivers in some embodiments are arrayed (i.e., acoustically summed, perhaps using a DSP) in such a way that the net polar response of the audio drivers directs sound to the left. Concurrently with the sound axis corresponding to the left channel, the audio drivers, in some embodiments, also form sound axes corresponding to center and right channels of the surround sound content to direct sound to the center and to the right, respectively.

One challenge with outputting multiple channels of audio content from a single playback device is outputting bass content at an appropriate volume. In operation, when multiple channels of audio are being played from a single acoustic box, each of the multiple channels may contain bass content that, given the relatively uniform dispersion of bass frequencies, sum in the acoustic box of the playback device and in the room in which the playback device is located, thereby producing a combined bass response that is louder than desired (e.g., louder than would be produced if each channel of the multi-channel audio content were produced on a separate respective playback device).

One way to improve the volume levels of bass content when outputting multi-channel audio content from a playback device is to extract the bass content from each channel of the multi-channel audio content and adjust the gain of the extracted bass content before mixing the gain-adjusted bass content back into the respective channels of the multi-channel audio content. The extracted bass content can include any audio content having a frequency below a threshold frequency, where the threshold frequency depends on a distance between two or more audio drivers of the playback device. Further, in some embodiments, the extent to which the bass content's gain is adjusted is based on (i) an energy of the extracted bass content after summing the bass content together (referred to herein as the energy of sums (EOS)) and (ii) a sum of the energies of the individual channels of extracted bass content (referred to herein as the sum of energies (SOE)). As explained in further detail below, the greater the difference between the EOS and the SOE, the greater the gain adjustment will be.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
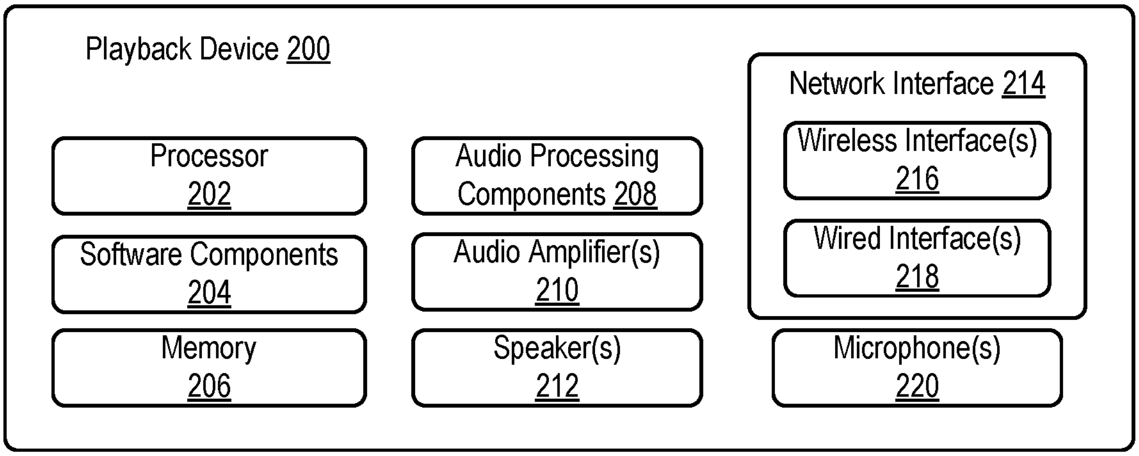
FIG. 2 is a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 is one type of voice-enabled device (VED).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices,"

which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network, including but not limited to data to/from other VEDs (e.g., commands to perform an SPL measurement, SPL measurement data, commands to set a system response volume, and other data and/or commands to facilitate performance of the features and functions disclosed and described herein). As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional audio drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices and/or other VEDs. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
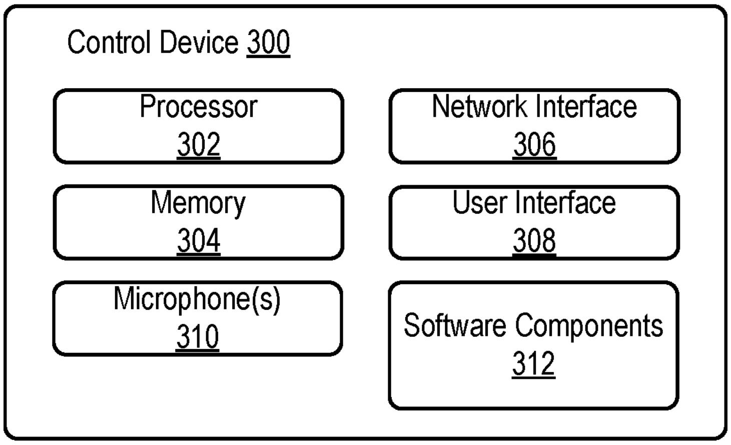
FIG. 3 is a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
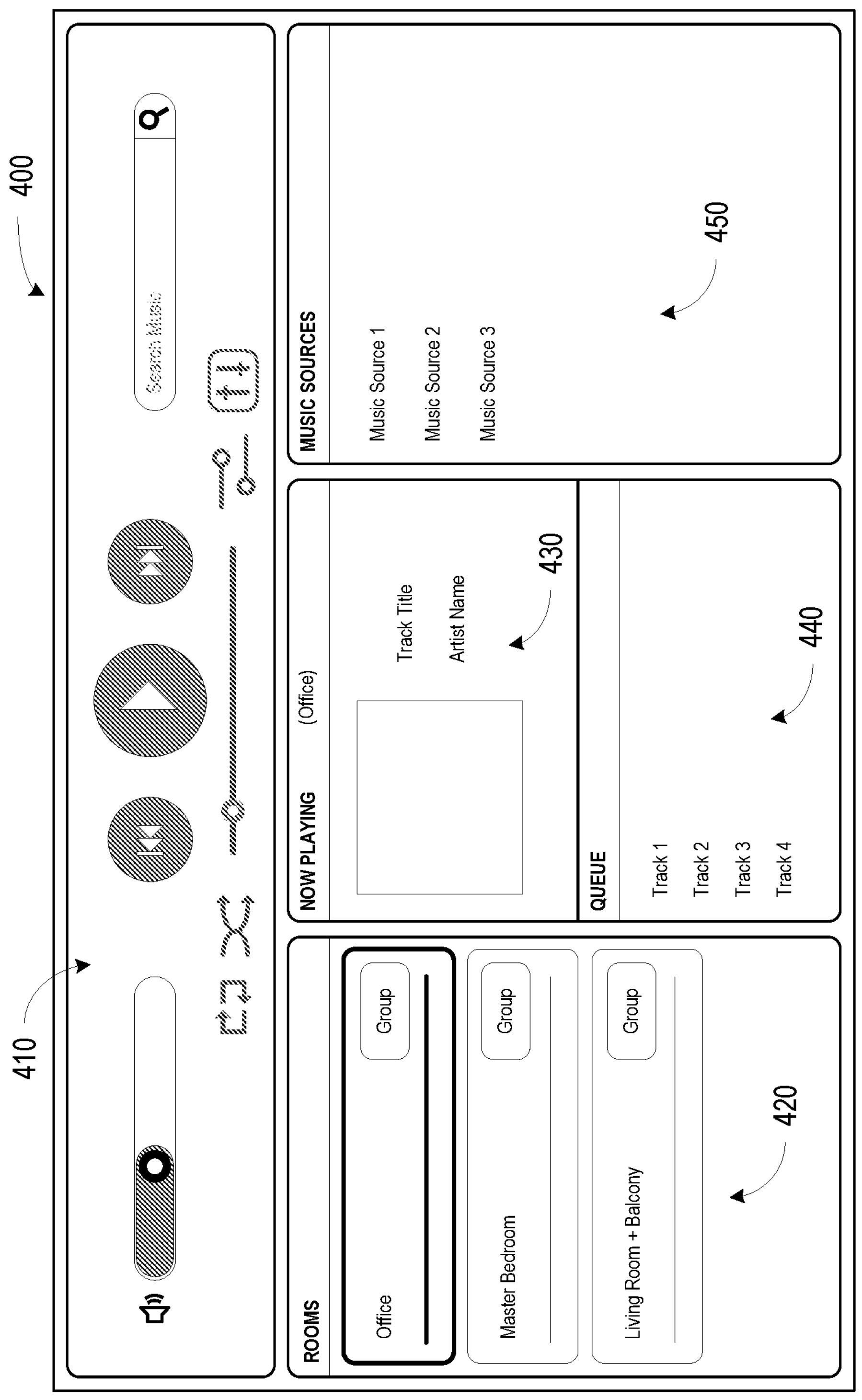
FIG. 4 is a diagram of an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Network Devices

Figure 5:
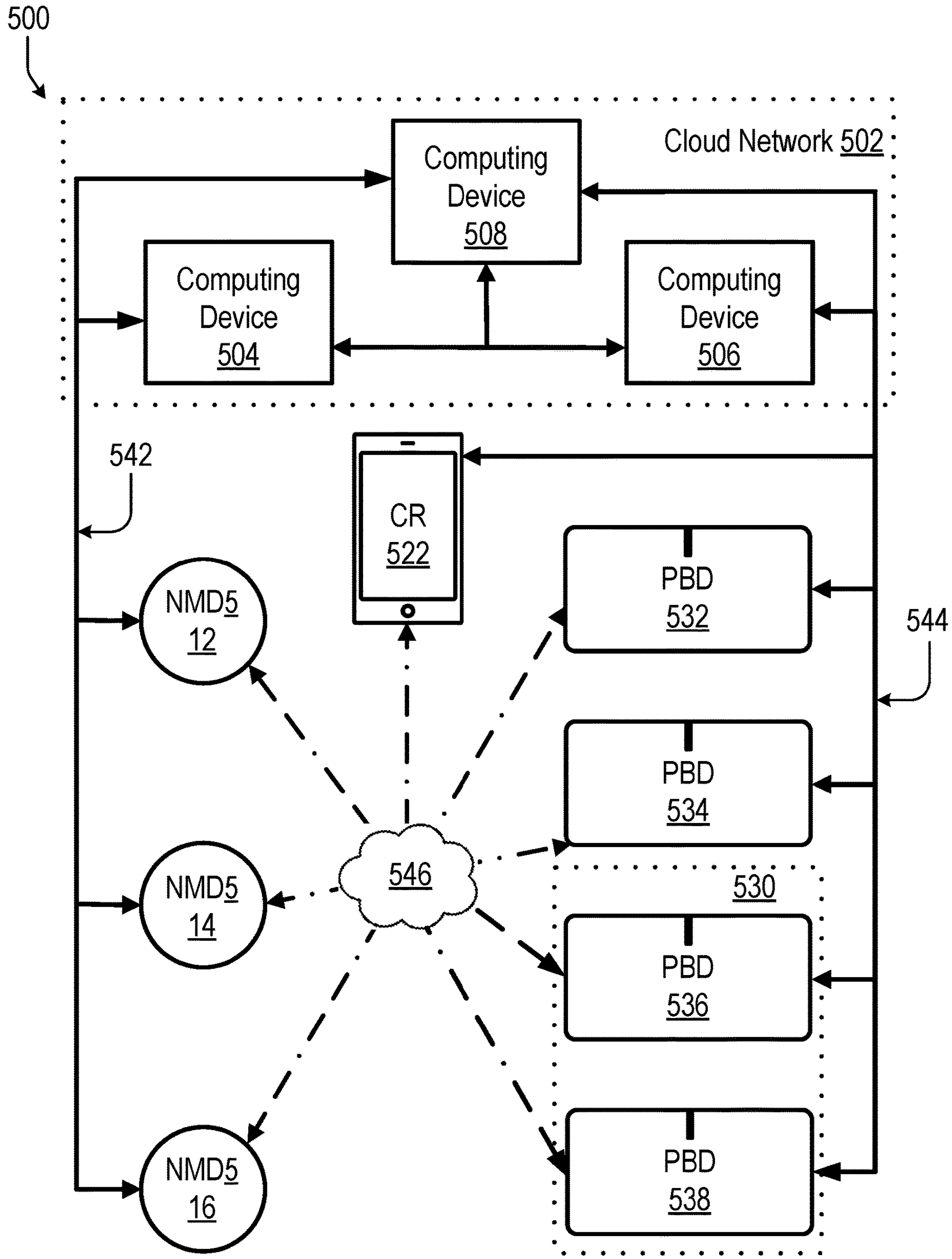
FIG. 5 is a functional block diagram of a plurality of network devices.

FIG. 5 shows an example plurality of network devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of network devices 500 includes computing devices 504, 506, and 508; network microphone devices (NMDs) 512, 514, and 516; playback devices (PBDs) 532, 534, 536, and 538; and a controller device (CR) 522. As described previously, any one or more (or all) of the NMDs 512-16, PBDs 532-38, and/or CR 522 may be voice-enabled devices (VEDs).

Each of the plurality of network devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 is configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or CR 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
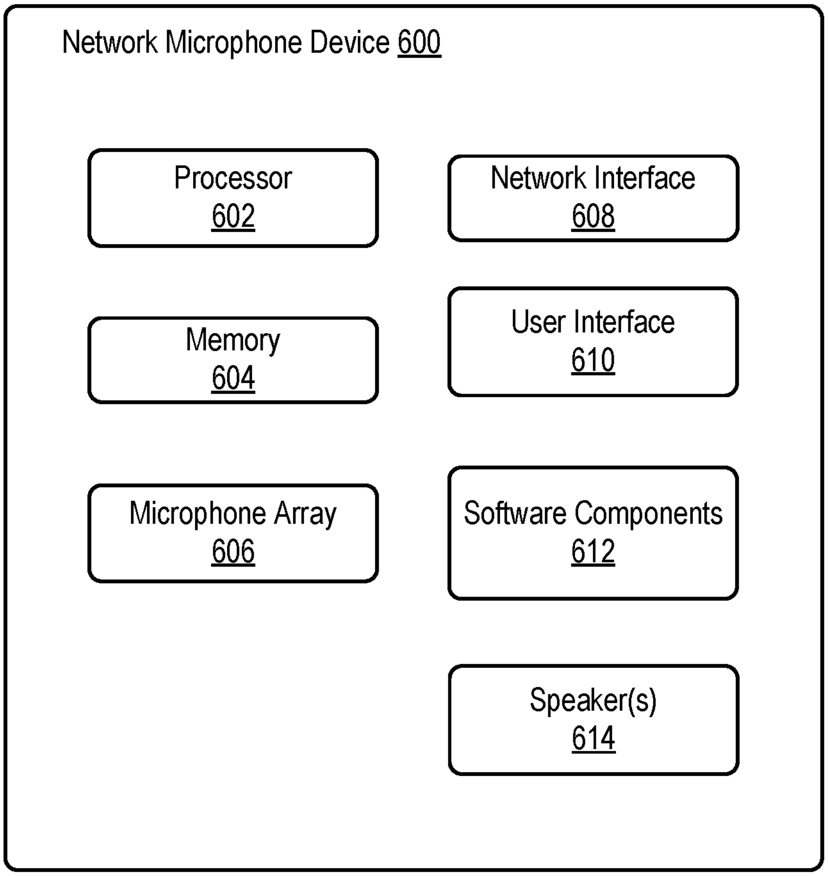
FIG. 6 is a functional block diagram of a network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

Figure 7:
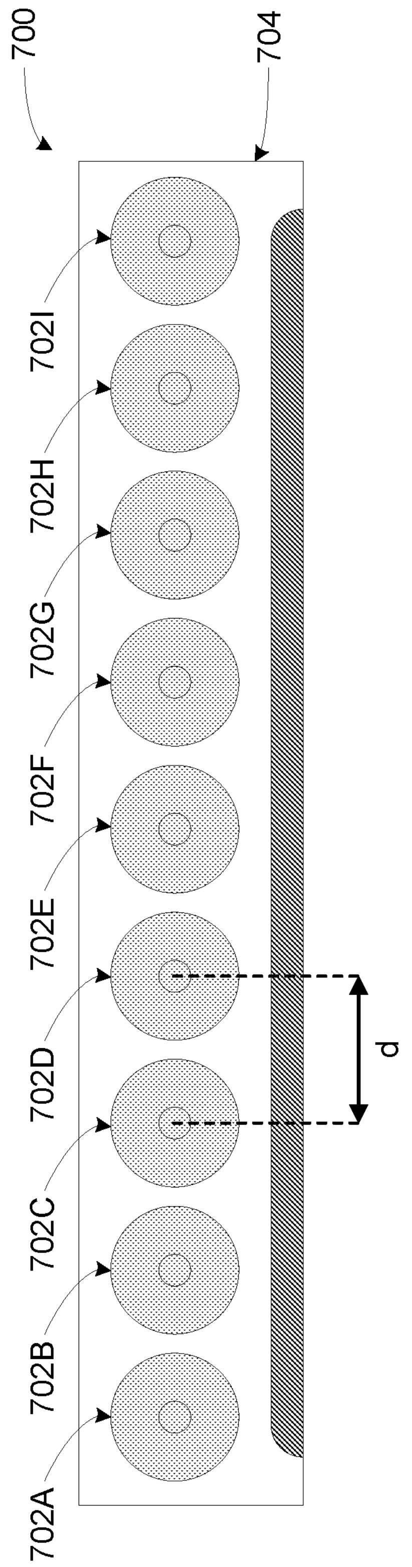
FIG. 7 is a schematic front view of an example playback device.

III. Example Systems for Adjusting Bass Levels of a Multi-Channel Audio Signal As discussed above, embodiments described herein facilitate adjusting the bass levels of a multi-channel audio signal for playback by a playback device. FIG. 7 is a schematic front view of a playback device 700 (e.g., a soundbar-type playback device) that includes audio drivers 702A, 702B, 702C, 702D, 702E, 702F, 702G, 702H, and 702I (hereinafter referred to as the audio drivers 702A-I) mounted in a housing 704. As shown, the audio drivers 702A-I are aligned in a horizontal plane. However, in some implementations, one or more of the audio drivers 702A-I may be offset from the horizontal plane and/or may be rotated relative to the horizontal plane in order to project sound along different axes. Further, each of the audio drivers 702A-I is depicted as being spaced apart from an adjacent driver by a distance d in the horizontal plane. But in some implementations, the audio drivers 702A-I may be non-uniformly spaced apart from one another. For instance, audio driver 702C may be closer to audio driver 702B than to audio driver 702D.

Audio drivers 702A-I can be configured to form various sound axes. For instance, in a home theater playback configuration, audio drivers 702A-I may form sound axes corresponding to front left, center, and front right audio channels. Alternatively, in another playback configuration, the audio drivers 702A-I may form another set of sound axes corresponding to left and right channels of audio content recorded in stereo.

In operation, the playback device 700 receives a multi-channel audio signal representing multi-channel audio content for playback. For instance, in some embodiments, playback device 700 receives a multi-channel audio signal that includes a left-channel audio signal, a center-channel audio signal, and a right-channel audio signal. Alternatively, the multi-channel audio signal may be a stereo audio signal that includes a left-channel audio signal and a right-channel audio signal, but not a center-channel audio signal.

The playback device 700 further includes audio processing components, such as audio processing components 208 (FIG. 2), for processing the multi-channel audio signal in a manner that causes the audio drivers 702A-I to output audio content along sound axes that correspond to the respective channels of the multi-channel audio signal. In operation, for each channel of the multi-channel audio signal, the audio processing components produce input signals that are amplified and provided to input terminals of one or more of the audio drivers 702A-I. For instance, in some embodiments, for left-channel content of the multi-channel audio signal, the audio processing components produce input signals for whichever ones of the audio drivers 702A-I are configured to output sound along a left-channel sound axis. The audio processing components similarly produce audio driver input signals for the remaining channels of the multi-channel audio signal, such as for center-channel content and/or right-channel content. An amplifier, such as the audio amplifier 210 (FIG. 2), of the playback device 700 amplifies the input signals, and the amplified input signals then cause the audio drivers 702A-I to output acoustic audio content along various sound axes that correspond to the respective channels of the multi-channel audio signal.

In line with the discussion above, when outputting multi-channel audio content from a single playback device, bass content from the respective channels of the multi-channel audio content may sum in an enclosure of the playback device as well as outside the playback device 700, such that the played back audio has undesirably loud bass levels. In some embodiments, for instance, undesirably loud bass levels are bass levels that are louder than what would be otherwise produced if each channel of the multi-channel audio content were produced via a separate respective playback device instead of a single playback device. Accordingly, in some embodiments, the playback device 700 further includes a bass management system (FIG. 8) for adjusting a gain of the bass content of the multi-channel audio signal to compensate for the bass summing that occurs when playing back the multi-channel audio signal from the single playback device 700. In some embodiments, the bass management system comprises one or more separate components individually or in combination with one or more digital signal processors configured to perform the bass management functions disclosed and described herein. In some embodiments, the bass management system comprises tangible, non-transitory computer-readable media that, when executed by one or more processors of a playback device, cause the playback device to perform the bass management functions disclosed and described herein.

Figure 8:
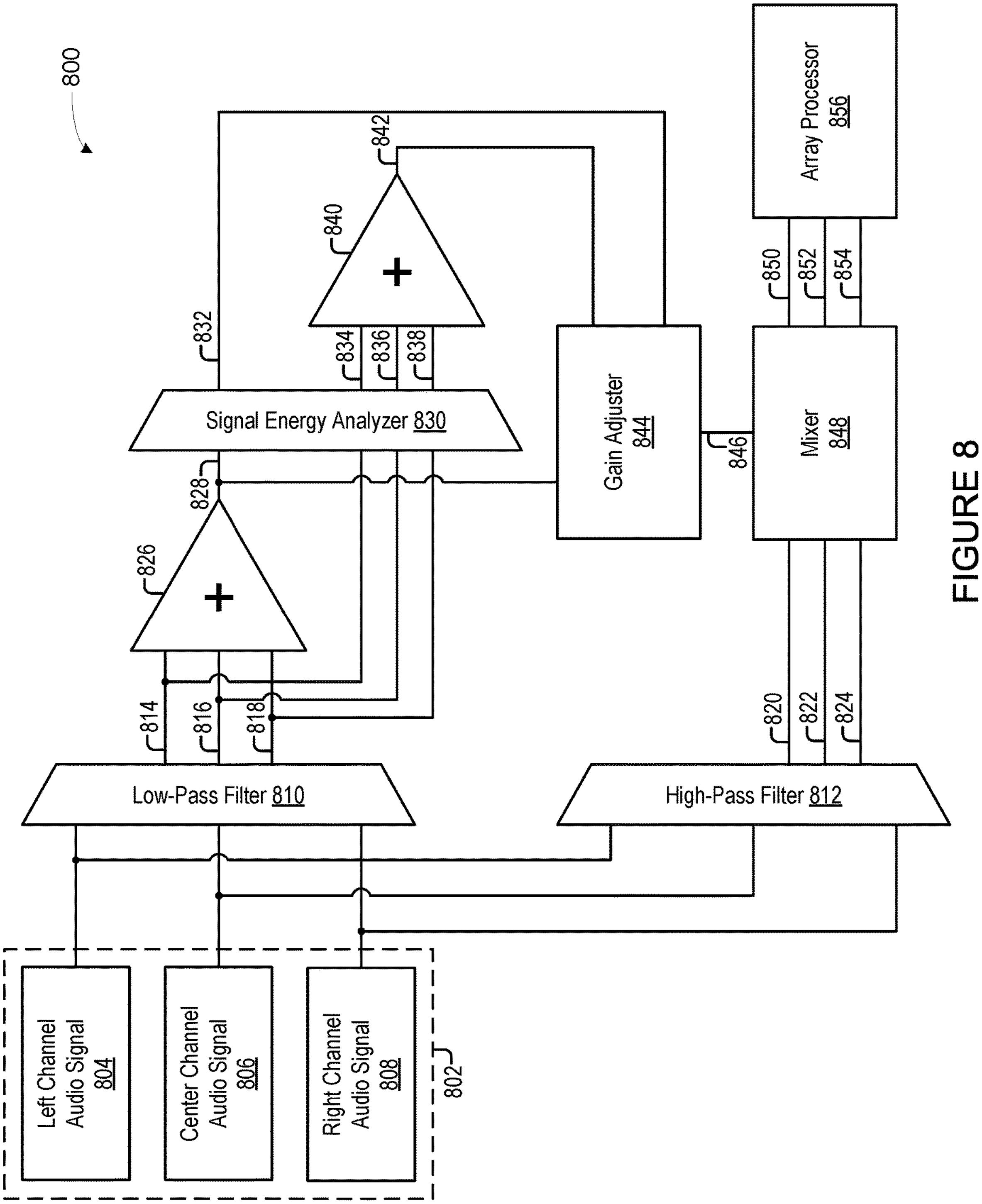
FIG. 8 is a functional block diagram of an example bass management system of a playback device.

FIG. 8 is a functional block diagram of an example bass management system 800 of a playback device, such as the playback device 700 (FIG. 7). In operation, the bass management system 800 receives a multi-channel audio signal 802. As shown, the multi-channel audio signal 802 is a three-channel audio signal that includes a left channel audio signal 804, a center channel audio signal 806, and a right channel audio signal 808. However, in some embodiments, the multi-channel audio signal 802 can include fewer, additional, and/or different channels.

The bass management system 800 is configured to process the left channel audio signal 804, the center channel audio signal 806, and the right channel audio signal 808 and separate low-frequency and high-frequency components of the channel signals. In the illustrated embodiment, the channel signals 804, 806, 808 pass through a low-pass filter 810 and a high-pass filter 812. The low-pass filter 810 is configured to filter out high-frequency components of the channel signals 804, 806, 808 that have frequencies above a threshold frequency, thereby outputting low-frequency components of the channel signals 804, 806, 808 that have frequencies below the threshold frequency. As such, the low-pass filter 810 outputs low-frequency left-channel signal components 814, low-frequency center-channel signal components 816, and low-frequency right-channel signal components 818. Similarly, the high-pass filter 812 filters out low-frequency components of the channel signals 804, 806, 808 that have frequencies below the threshold frequency, thereby outputting high-frequency components of the channel signals 804, 806, 808 that have frequencies above the threshold frequency. As such, the high-pass filter 812 outputs high-frequency left-channel signal components 820, high-frequency center-channel signal components 822, and high-frequency right-channel signal components 824.

In line with the discussion above, the bass management system 800, in some embodiments, is configured to adjust the gain of low-frequency signals to reduce the sound levels of undesirably loud bass. To facilitate this, the low-frequency components 814, 816, 818 of the multi-channel audio signal 802, in some embodiments, undergoes a gain-adjustment process that depends at least in part on the energies of the low-frequency components 814, 816, 818.

A signal summer 826 is configured to combine the low-frequency components 814, 816, 818 to form a single consolidated low-frequency signal 828. A signal energy analyzer 830 is configured to receive the consolidated low-frequency signal 828, and to determine an electrical energy of the consolidated low-frequency signal 828. For instance, for a digital audio signal that includes a discrete number of N samples over time, the signal energy analyzer 830, in some embodiments, calculates the signal energy as $E=\Sigma_{n=1}^{N}|x(n)|^2$. Similarly, for an analog audio signal, the signal energy analyzer 830, in some embodiments, calculates the signal energy by integrating the square of the signal over time. The signal energy analyzer 830 determines the energy of the consolidated low-frequency signal 828 and outputs an indication of the determined energy 832. This determined energy 832 of the consolidated low-frequency signal 828 may be referred to as an energy of sums (EOS), as this EOS 832 is the energy of the sum of the low-frequency components 814, 816, 818 of the multi-channel audio signal 802.

As further shown, in addition to receiving the consolidated low-frequency signal 828, the signal energy analyzer 830, in some embodiments, is also configure to receive the individual low-frequency components 814, 816, 818 of the multi-channel audio signal 802. The signal energy analyzer 830 determines energies of each of the low-frequency components 814, 816, 818 and outputs indications of the determined energies 834, 836, 838. A summing device 840 sums together the determined energies 834, 836, 838, and outputs an indication of a sum of energies (SOE) 842 of the determined energies 834, 836, 838. The SOE 842 comprises the sum of the energies 834, 836, 838 of the low-frequency components 814, 816, 818 of the multi-channel audio signal 802.

The bass management system 800 is configured to use the EOS 832 and the SOE 842 to adjust a gain of the low-frequency components 814, 816, 818 of the multi-channel audio signal 802. A gain adjuster 844 receives the EOS 832, the SOE 842, and the consolidated low-frequency signal 828, and is configured to use the EOS 832 and SOE 842 to calculate a gain and apply the gain to the consolidated low-frequency signal 828. In particular, a scenario in which the EOS 832 is larger than the SOE 842 may indicate that playing back the low-frequency components 814, 816, 818 without a gain reduction would produce undesirably loud bass sounds. In some examples, the gain adjuster 844 calculates the gain of the consolidated low-frequency signal 828 as $G=E_1/E_2$, where $E_1$ is the SOE 842, and $E_2$ is the EOS 832. When the EOS 832 is larger than the SOE 842, the gain is less than 1, such that the amplitude of the consolidated low-frequency signal 828, and consequently the volume of any audio content that includes the low-frequency signal 828, is reduced.

However, with the above gain equation, when the EOS 832 is very small and approaching zero, the calculated gain can grow very large, and when the SOE 842 is very small and approaching zero, the calculated gain can similarly grow very small and approach zero. In order to avoid these conditions, the gain adjuster 844, in some embodiments, calculates the gain as $G=(E_1+\Gamma*\varepsilon)/(E_2+\varepsilon)$, where $\varepsilon$ is a constant that is relatively small compared to typical values of the EOS 832 and SOE 842, and where $\Gamma$ is a default gain value that the gain equation can settle to when both the EOS 832 and SOE 842 approach zero.

After the gain adjuster 844 has determined the gain, the gain adjuster 844 applies the gain to the consolidated low-frequency signal 828, thereby producing a gain-adjusted low-frequency signal 846. In some embodiments, instead of applying the gain to the consolidated low-frequency signal 828, the gain adjuster 844 can apply the gain individually to each of the low-frequency components 814, 816, 818.

The gain adjuster 844 provides the gain-adjusted low-frequency signal 846 to a mixer 852, which also receives the high-frequency components 820, 822, 824 from the high-pass filter 812. The mixer 852 combines the gain-adjusted low-frequency signal 846 with the high-frequency components 820, 822, 824 by mixing the gain-adjusted low-frequency signal 846 back into the respective high-frequency signal components 820, 822, 824. In this regard, the mixer 848 produces (i) a gain-adjusted left channel audio signal 850 that includes the left channel high-frequency components 820 mixed with the gain-adjusted low-frequency signal 846, (ii) a gain-adjusted center channel audio signal 852 that includes the center channel high-frequency components 822 mixed with the gain-adjusted low-frequency signal 846, and (iii) a gain-adjusted right channel audio signal 854 that includes the right channel high-frequency components 824 mixed with the gain-adjusted low-frequency signal 846.

An array processor 856 is configured to receive the gain-adjusted left, center, and right audio signals 850, 852, 854, and further configured to route the gain-adjusted signals 850, 852, 854 to certain audio drivers of the playback device to achieve the desired sound axes, as described above. For instance, the gain-adjusted left channel signal 850 can be routed to audio drivers that are arranged to produce a left channel sound axis, the gain-adjusted center channel signal 852 can be routed to audio drivers that are arranged to produce a center channel sound axis, and the gain-adjusted right channel signal 854 can be routed to audio drivers that are arranged to produce a right channel sound axis.

In some embodiments, instead of mixing the gain-adjusted low-frequency signal 846 back into the respective high-frequency signal components 820, 822, 824 and then passing the gain-adjusted left, center, and right signals 850, 852, 854 through the array processor 856, the high-frequency components may be passed through the array processor 856 and then the gain-adjusted low-frequency signal 846 may be mixed back into the left, center, and right channels as they are routed by the array processor 856 to the audio drivers of the playback device.

In the above embodiments, the threshold frequency of the low-pass filter 810 and the high-pass filter 812 can be chosen in various ways. For instance, in some embodiments, the threshold frequency is set based at least in part on the geometry of the playback device. For instance, as discussed above, when multiple channels of audio are played back by a single playback device, the low-frequency components of the multi-channel audio may constructively interfere with one another to produce an audio response that is louder than desired. Constructive interference may occur when the audio drivers producing the audio response are separated from one another by a distance that corresponds to an odd-integer multiple of a quarter-wavelength of the audio signal. Accordingly, in some embodiments, the threshold frequency is set equal to or greater than a sound frequency for which a distance between audio drivers of the playback device is an odd-integer multiple of a quarter-wavelength of the sound frequency. For instance, referring to the playback device 700 (FIG. 7), the audio drivers 702A-I are separated from one another by the distance d. As such, in some embodiments, the threshold frequency for the playback device 700 is equal to or greater than a sound frequency that has a quarter-wavelength that is equal to the distance d divided by an odd integer. In this manner, sounds that experience quarter-wave constructive interference are filtered through the low-pass filter 810 and have their gain reduced as described above. With this approach, longer or larger playback devices that have audio drivers spaced farther apart may have a lower threshold frequency than shorter or smaller playback devices that have audio drivers spaced closer together.

In some embodiments, the threshold frequency has a wavelength that is a different fractional portion of the spacing of the audio drivers. In such embodiments, the distance d between the audio drivers is different than an odd-integer multiple of a quarter wavelength of sound at the threshold frequency.

The threshold frequency can additionally or alternatively be related to the geometry of the playback device in various other ways. In some embodiments, the threshold frequency is based on an efficacy of audio output arraying that depends on the spacing of the audio drivers. In particular, playback devices with longer audio driver arrays (e.g., playback devices that have a longer distance d between audio drivers) can output low frequencies along a given sound axis more effectively than playback devices with shorter audio driver arrays (e.g., playback devices that have a shorter distance d between audio drivers). Accordingly, in some embodiments, the threshold frequency is set equal to or greater than the lowest sound frequency that the playback device can effectively (i.e., perceptible to a human ear) output along a particular sound axis using the playback device's audio driver array. And because long audio driver arrays are more effective at arraying low frequencies than short audio driver arrays, playback devices with long audio driver arrays, in such embodiments, have a lower threshold frequency than playback devices with short audio driver arrays.

In some embodiments, the spacing of the audio drivers is not the only consideration in determining the threshold frequency, or the spacing of the audio drivers is not considered at all. For instance, in some embodiments, the threshold frequency is chosen based on the frequencies of bass signals in the audio spectrum. Bass frequencies are traditionally defined as frequencies below 250 Hertz (Hz). Accordingly, in some examples, the threshold frequency is 250 Hz such that the low-pass filter 810 outputs components of the channel signals 804, 806, 808 that are less than 250 Hz, and the high-pass filter 812 outputs components of the channel signals 804, 806, 808 that are equal to or greater than 250 Hz. In other embodiments, the threshold frequency is set to a frequency other than 250 Hz, such as 100 Hz, 150 Hz, 200 Hz, 300 Hz, 350 Hz, 400 Hz, 450 Hz, 500 Hz or perhaps another threshold frequency. In some embodiments, the playback device is configured to set the threshold frequency in response to a user input that specifies the threshold frequency.

In some embodiments, the bass management system 800 considers a volume (e.g., a sound pressure level, a sound power level, an amplitude) of the multi-channel audio signal before adjusting the gain of the bass content of the multi-channel signal. For instance, human ears are less sensitive to bass frequencies than to higher frequencies, such that a listener might not be able to perceive a difference between the gain-adjusted bass content and untreated bass content at low volumes. As such, in some embodiments, the bass management system 800 is configured to only adjust the gain of the bass content of the multi-channel audio signal when a volume of the multi-channel audio signal is above a threshold volume. In operation, the bass management system 800 may determine the volume of the multi-channel audio signal in various ways, such as based on a volume setting specified by a control device of the playback device. If the volume of the multi-channel audio signal is above the threshold volume, then the bass management system 800, in some embodiments, responsively adjusts the gain of the bass content of the multi-channel signal as described above. On the other hand, if the volume is below the threshold volume, then the bass management system 800 in such embodiments may forego adjusting the gain of the bass content.

In some embodiments, the multi-channel audio signal may have already been processed by another device to have the gain of its bass content adjusted before the playback device receives the multi-channel audio signal. In these situations, it could be desirable for the bass management system 800 to avoid performing a subsequent gain-adjustment for the bass content. Accordingly, the bass management system 800 may be configured to determine whether the multi-channel audio signal has already been processed to have gain-adjusted bass content. Such a determination could be made based on metadata of the multi-channel audio signal indicating that the signal has been processed, or based on the playback device receiving the multi-channel audio signal from a device that is known to pre-adjust the gain of its bass content. Other examples are possible as well. In any case, if the bass management system 800 determines that the multi-channel audio signal has not already had its bass content gain-adjusted, then the bass management system 800 may responsively adjust the gain of the bass content of the multi-channel signal as described above. On the other hand, if the bass management system 800 determines that the multi-channel audio signal has already had its bass content gain-adjusted, then the bass management system 800 may forego adjusting the gain of the bass content.

The various components of the bass management system 800 may be implemented in whole or in part by one or more of the components described above with respect to playback device 200 (FIG. 2). For instance, some or all of the functionality of the bass management system 800 may be performed by the audio processing components 208 and/or the one or more processors 202 executing the software components 204 stored in the memory 206 of the playback device 200.

V. Example Methods for Adjusting Bass Levels of a Multi-Channel Audio Signal

Figure 9:
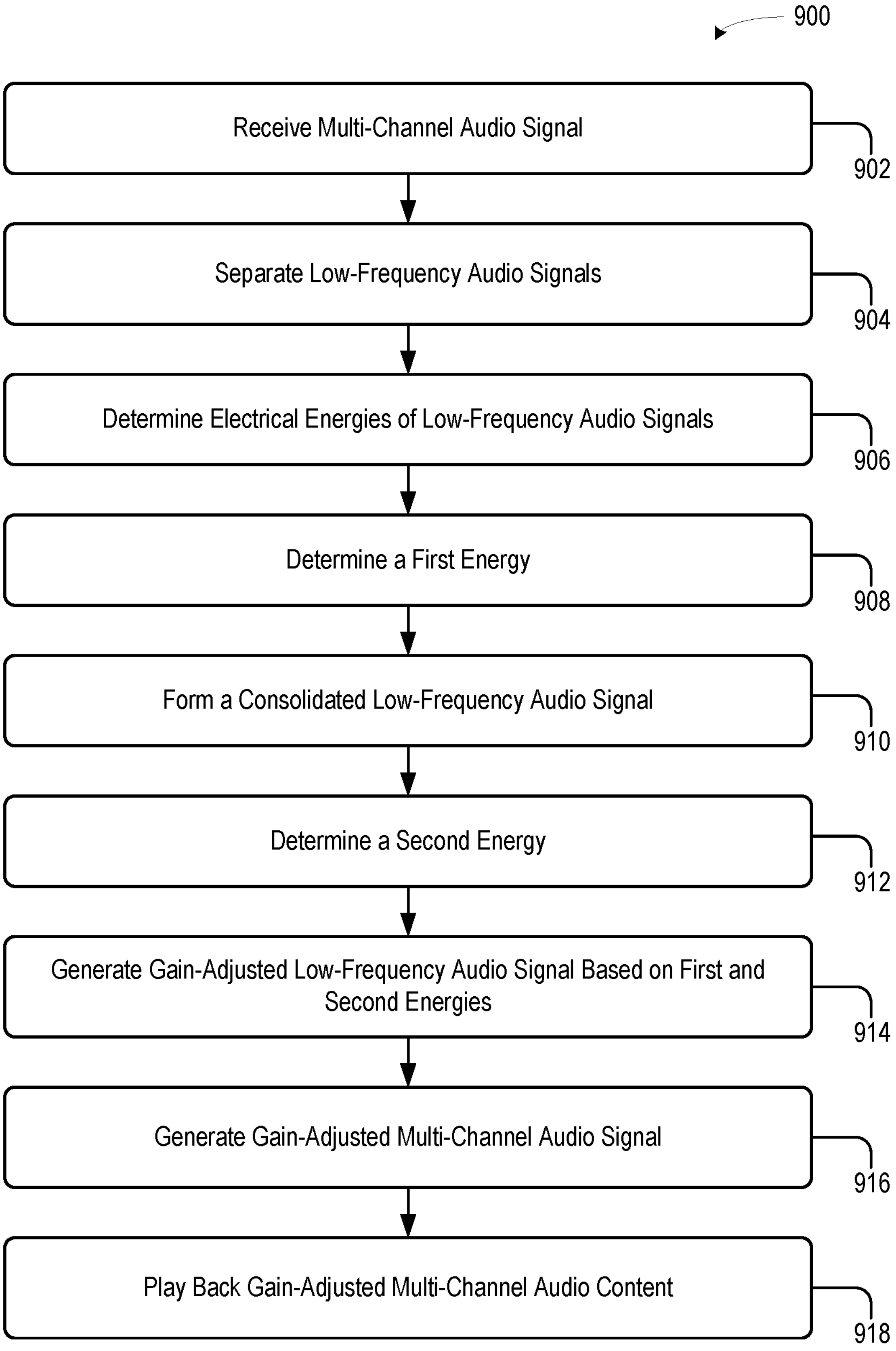
FIG. 9 is a flowchart of an example method.

FIG. 9 shows an example embodiment of a method 900 that can be implemented by a playback device, such as playback device 700 or any of the playback devices disclosed and/or described herein that are capable of playing back multi-channel audio, or any other multi-channel playback device now known or later developed.

Various embodiments of method 900 include one or more operations, functions, and actions illustrated by blocks 902 through 918. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 900 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

Method 900 begins at block 902, which includes receiving, by a playback device, a multi-channel audio signal representing multi-channel audio content for playback by the playback device. In operation, the step of receiving the multi-channel audio signal at block 902 can be performed using any of the interfaces disclosed and described herein, such as wireless interfaces 216 or wired interfaces 218, and/or one or more other suitable interfaces. Further, the multi-channel audio signal can include signals corresponding to any suitable number of audio channels. For instance, the multi-channel audio signal can include signals corresponding to three different audio channels, including a left-channel audio signal, a center-channel audio signal, and a right-channel audio signal.

At block 904, the method 900 separates, from respective channels of the multi-channel audio signal, respective low-frequency audio signals that are below a threshold frequency. In some embodiments, the playback device may include a number of audio drivers, including a first audio driver and a second audio driver, and a value of the threshold frequency may be based on a distance between the first and second audio drivers. For instance, the threshold frequency may be chosen such that the distance between the first and second audio drivers is an odd-integer multiple of a quarter-wavelength of the threshold frequency.

In embodiments in which the multi-channel audio signal includes a left-channel audio signal, a center-channel audio signal, and a right-channel audio signal, the step of separating the respective low-frequency audio signals from the respective channels of the multi-channel audio signal at block 904 may include (i) separating, from the left-channel audio signal, a first low-frequency audio signal that is below the threshold frequency, (ii) separating, from the center-channel audio signal, a second low-frequency audio signal that is below the threshold frequency; and (iii) separating, from the right-channel audio signal, a third low-frequency audio signal that is below the threshold frequency.

At block 906, the method 900 determines respective electrical energies of each respective low-frequency audio signal. And at block 908, method 900 includes determining a first energy ($E_1$) by summing the respective electrical energies of each respective low-frequency audio signal.

At block 910, method 900 consolidates the respective low-frequency audio signals into a consolidated low-frequency audio signal. And at block 912, the method 900 determines a second energy ($E_2$) by determining an electrical energy of the consolidated low-frequency audio signal.

At block 914, the method 900 generates a gain-adjusted low-frequency audio signal by adjusting a gain of the consolidated low-frequency audio signal based on both (i) the first energy and (ii) the second energy. In some embodiments, the adjusted gain of the consolidated low-frequency audio signal may be equal to $G=E_1/E_2$ or $G=(E_1+\Gamma*\varepsilon)/(E_2+\varepsilon)$, where $\varepsilon$ is a constant that is relatively small compared to typical values of $E_1$ and $E_2$, and where $\Gamma$ is a default gain value that the gain equation can settle to when both the $E_1$ and $E_2$ approach zero.

At block 916, the method 900 generates a gain-adjusted multi-channel audio signal by mixing the gain-adjusted low-frequency audio signal back into the respective channels of the multi-channel audio signal. In embodiments in which the multi-channel audio signal includes a left-channel audio signal, a center-channel audio signal, and a right-channel audio signal, the step of mixing the gain-adjusted low-frequency audio signal back into the respective channels of the multi-channel audio signal at block 916 may include (i) mixing the gain-adjusted low-frequency audio signal back into the left-channel audio signal, (ii) mixing the gain-adjusted low-frequency audio signal back into the center-channel audio signal, and (iii) mixing the gain-adjusted low-frequency audio signal back into the right-channel audio signal.

In some embodiments, the method 900 *l* at block 914 can further adjust a gain of each of the respective low-frequency audio signals instead of adjusting the gain of the consolidated low-frequency audio signal. For instance, this step may include (i) generating a gain-adjusted left-channel low-frequency audio signal, (ii) generating a gain-adjusted center-channel low-frequency audio signal, and (iii) generating a gain-adjusted right-channel low-frequency audio signal. In such embodiments, the step of mixing the gain-adjusted low-frequency audio signal back into the respective channels of the multi-channel audio signal at block 916 may include (i) mixing the gain-adjusted left-channel low-frequency audio signal back into the left-channel audio signal, (ii) mixing the gain-adjusted center-channel low-frequency audio signal back into the center-channel audio signal, and (iii) mixing the gain-adjusted right-channel low-frequency audio signal back into the right-channel audio signal.

At block 918, the method 900 plays back gain-adjusted multi-channel audio content via a plurality of audio drivers of the playback device. In some embodiments, the step of playing back the gain-adjusted multi-channel audio content at block 918 may include providing respective components of the gain-adjusted multi-channel audio signal to respective audio drivers of the plurality of audio drivers in order to project sound along various sound axes, such as along a left-channel axis, a center-channel axis, and a right-channel axis.

In some embodiments, the multi-channel audio signal received by the playback device at block 902 may include a plurality of frames of audio content, and the method 900 may be carried out with respect to respective frames of the plurality of frames. For instance, the step of determining the respective electrical energies of each respective low-frequency audio signal at block 906 may include determining, for an individual frame of the plurality of frames, the respective electrical energies of each respective low-frequency audio signal, and the step of determining the electrical energy of the consolidated low-frequency audio signal at block 910 may include determining, for the individual frame of the plurality of frames, the electrical energy of the consolidated low-frequency audio signal.

In some embodiments, method 900 determines a volume of the multi-channel audio signal, and, in response, performs one or more of the steps of method 900 at blocks 904-918. For instance, the playback device could determine the volume of the multi-channel audio signal after receiving the signal at block 902 and before performing any other steps of the method 900. If the determined volume is above the threshold volume, then the method 900 may responsively advance to block 904. However, if the determined volume is below the threshold volume, then the method 900 may end.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a computer memory, DVD, CD, Blu-ray, and so on, storing the software and/or firmware.

What is claimed is:

1. A system comprising:

one or more processors;

tangible, non-transitory computer-readable media comprising program instructions executable by the one or more processors such that the system is configured to:

receive a multi-channel audio signal comprising a first channel and a second channel;

for the first channel, (i) apply a low pass filter to the first channel to obtain a low-frequency component of the first channel, wherein the low-frequency component of the first channel comprises audio information below a threshold frequency, and (ii) determine an energy of the low-frequency component of the first channel;

for the second channel, (i) apply the low pass filter to the second channel to obtain a low-frequency component of the second channel, wherein the low-frequency component of the second channel comprises audio information below the threshold frequency, and (ii) determine an energy of the low-frequency component of the second channel;

sum the energies of the determined low-frequency components to obtain a sum of energies of the low-frequency components;

combine the determined low-frequency components of each channel into a consolidated low-frequency signal;

determine an electrical energy of the consolidated low-frequency signal;

generate a gain-adjusted low-frequency signal based on (i) the sum of the energies of the low-frequency components and (ii) the electrical energy of the consolidated low-frequency signal;

generate a gain-adjusted multi-channel audio signal comprising the gain-adjusted low-frequency signal; and cause playback of the gain-adjusted multi-channel audio signal via a plurality of audio drivers.

2. The system of claim 1, wherein the first channel comprises a left channel and the second channel comprises a right channel.

3. The system of claim 1, wherein the multi-channel audio signal further comprises a third channel, and wherein the program instructions further comprise program instructions executable by the one or more processors such that the system is configured to:

for the third channel, (i) apply a low pass filter to the third channel to obtain a low-frequency component of the third channel, wherein the low-frequency component of the third channel comprises audio information below a threshold frequency, and (ii) determine an energy of the low-frequency component of the third channel.

4. The system of claim 1, wherein the program instructions executable by the one or more processors such that the system is configured to generate the gain-adjusted low-frequency signal based on (i) the sum of the energies of the low-frequency components and (ii) the electrical energy of the consolidated low-frequency signal comprise program instructions executable by the one or more processors such that the system is configured to:

calculate a gain according to $G=E_1/E_2$, where G comprises the gain, $E_1$ comprises the sum of the energies of the low-frequency components, and $E_2$ comprises the electrical energy of the consolidated low-frequency signal; and generate the gain-adjusted low-frequency signal by applying the gain to the consolidated low-frequency signal.

5. The system of claim 1, wherein the program instructions executable by the one or more processors such that the system is configured to generate the gain-adjusted low-frequency signal based on (i) the sum of the energies of the low-frequency components and (ii) the electrical energy of the consolidated low-frequency signal comprise program instructions executable by the one or more processors such that the system is configured to:

calculate a gain according to $G=[E_1+(\Gamma*\varepsilon)]/[E_2+\varepsilon]$, where G comprises the gain, $E_1$ comprises the sum of the energies of the low-frequency components, $E_2$ comprises the electrical energy of the consolidated low-frequency signal, Γ comprises a default gain, and ε comprises a constant; and generate the gain-adjusted low-frequency signal by applying the gain to the consolidated low-frequency signal.

6. The system of claim 1, wherein the program instructions executable by the one or more processors such that the system is configured to generate the gain-adjusted multi-channel audio signal comprising the gain-adjusted low-frequency signal comprise program instructions executable by the one or more processors such that the system is configured to:

for the first channel, (i) apply a high pass filter to the first channel to obtain a high-frequency component of the first channel, wherein the high-frequency component of the first channel comprises audio information above the threshold frequency, and (ii) mix the high-frequency component of the first channel with the gain-adjusted low-frequency signal; and for the second channel, (i) apply the high pass filter to the second channel to obtain a high-frequency component of the second channel, wherein the high-frequency component of the second channel comprises audio information above the threshold frequency, and (ii) mix the high-frequency component of the second channel with the gain-adjusted low-frequency signal.

7. The system of claim 1, wherein each channel in the multi-channel audio signal corresponds to a sound axis, and wherein the program instructions executable by the one or more processors such that the system is configured to cause playback of the gain-adjusted multi-channel audio signal via the plurality of audio drivers comprise program instructions executable by the one or more processors such that the system is configured to:

for each gain-adjusted channel in the gain-adjusted multi-channel audio signal, cause playback of the gain-adjusted channel via a sound axis corresponding to the channel.

8. The system of claim 7, further comprising the plurality of audio drivers, wherein the plurality of audio drivers comprises a first audio driver and a second audio driver, and wherein a value of the threshold frequency is based at least in part on a distance between the first audio driver and the second audio driver.

9. The system of claim 8, wherein the distance between the first audio driver and the second audio driver is an odd-integer multiple of a quarter-wavelength of the threshold frequency.

10. The system of claim 1, wherein the one or more processors, the tangible, non-transitory computer-readable media, and the plurality of audio drivers are contained within a single playback device.

11. Tangible, non-transitory computer-readable media comprising program instructions executable by one or more processors such that a system is configured to perform functions comprising:

receiving a multi-channel audio signal comprising as first channel and a second channel;

for the first channel, (i) applying a low pass filter to the first channel to obtain a low-frequency component of the first channel, wherein the low-frequency component of the first channel comprises audio information below a threshold frequency, and (ii) determining an energy of the low-frequency component of the first channel;

for the second channel, (i) applying the low pass filter to the second channel to obtain a low-frequency component of the second channel, wherein the low-frequency component of the second channel comprises audio information below the threshold frequency, and (ii) determining an energy of the low-frequency component of the second channel;

summing the energies of the determined low-frequency components to obtain a sum of energies of the low-frequency components;

combining the determined low-frequency components of each channel into a consolidated low-frequency signal;

determining an electrical energy of the consolidated low-frequency signal;

generating a gain-adjusted low-frequency signal based on (i) the sum of the energies of the low-frequency components and (ii) the electrical energy of the consolidated low-frequency signal;

generating a gain-adjusted multi-channel audio signal comprising the gain-adjusted low-frequency signal; and causing playback of the gain-adjusted multi-channel audio signal via a plurality of audio drivers.

12. The tangible, non-transitory computer-readable media of claim 11, wherein the first channel comprises a left-channel and the second channel comprises a right channel.

13. The tangible, non-transitory computer-readable media of claim 11, wherein the multi-channel audio signal further comprises a third channel, and wherein the functions further comprise:

for the third channel, (i) applying a low pass filter to the third channel to obtain a low-frequency component of the third channel, wherein the low-frequency component of the third channel comprises audio information below a threshold frequency, and (ii) determining an energy of the low-frequency component of the third channel.

14. The tangible, non-transitory computer-readable media of claim 11, wherein generating the gain-adjusted low-frequency signal based on (i) the sum of the energies of the low-frequency components and (ii) the electrical energy of the consolidated low-frequency signal comprises:

calculating a gain according to $G=E_1/E_2$, where G comprises the gain, $E_1$ comprises the sum of the energies of the low-frequency components, and $E_2$ comprises the electrical energy of the consolidated low-frequency signal; and generating the gain-adjusted low-frequency signal by applying the gain to the consolidated low-frequency signal.

15. The tangible, non-transitory computer-readable media of claim 11, wherein generating the gain-adjusted low-frequency signal based on (i) the sum of the energies of the low-frequency components and (ii) the electrical energy of the consolidated low-frequency signal comprises:

calculating a gain according to $G=[E_1+(\Gamma*\varepsilon)]/[E_2+\varepsilon]$, where G comprises the gain, $E_1$ comprises the sum of the energies of the low-frequency components, $E_2$ comprises the electrical energy of the consolidated low-frequency signal, Γ comprises a default gain, and ε comprises a constant; and generating the gain-adjusted low-frequency signal by applying the gain to the consolidated low-frequency signal.

16. The tangible, non-transitory computer-readable media of claim 11, wherein generating the gain-adjusted multi-channel audio signal comprising the gain-adjusted low-frequency signal comprises:

for the first channel, applying a high pass filter to the first channel to obtain a high-frequency component of the first channel, wherein the high-frequency component of the first channel comprises audio information above the threshold frequency, and (ii) mixing the high-frequency component of the first channel with the gain-adjusted low-frequency channel; and for the second channel, (i) applying the high pass filter to the second channel to obtain a high-frequency component of the second channel, wherein the high-frequency component of the second channel comprises audio information above the threshold frequency, and (ii) mixing the high-frequency component of the second channel with the gain-adjusted low-frequency signal.

17. The tangible, non-transitory computer-readable media of claim 11, wherein each channel in the multi-channel audio signal corresponds to a sound axis, and wherein causing playback of the gain-adjusted multi-channel audio signal via the plurality of audio drivers comprises:

for each gain-adjusted channel in the gain-adjusted multi-channel audio signal, causing playback of the gain-adjusted channel via a sound axis corresponding to the channel.

18. The tangible, non-transitory computer-readable media of claim 11, wherein the system comprises the plurality of audio drivers, wherein the plurality of audio drivers comprises a first audio driver and a second audio driver, and wherein a value of the threshold frequency is based at least in part on a distance between the first audio driver and the second audio driver.

19. The tangible, non-transitory computer-readable media of claim 18, wherein the distance between the first audio driver and the second audio driver is an odd-integer multiple of a quarter-wavelength of the threshold frequency.

20. A method comprising:

receiving a multi-channel audio signal comprising a first channel and a second channel;

for the first channel, (i) applying a low pass filter to the first channel to obtain a low-frequency component of the first channel, wherein the low-frequency component of the first channel comprises audio information below a threshold frequency, and (ii) determining an energy of the low-frequency component of the first channel;

for the second channel, (i) applying the low pass filter to the second channel to obtain a low-frequency component of the second channel, wherein the low-frequency component of the second channel comprises audio information below the threshold frequency, and (ii) determining an energy of the low-frequency component of the second channel;

summing the energies of the determined low-frequency components to obtain a sum of energies of the low-frequency components;

combining the determined low-frequency components of each channel into a consolidated low-frequency signal;

determining an electrical energy of the consolidated low-frequency signal;

generating a gain-adjusted low-frequency signal based on (i) the sum of the energies of the low-frequency components and (ii) the electrical energy of the consolidated low-frequency signal;

generating a gain-adjusted multi-channel audio signal comprising the gain-adjusted low-frequency signal; and causing playback of the gain-adjusted multi-channel audio signal via a plurality of audio drivers.

* * * * *